(12) United States Patent
Smith et al.

(10) Patent No.: US 8,946,641 B2
(45) Date of Patent: Feb. 3, 2015

(54) METHOD FOR IDENTIFYING MATERIALS USING DIELECTRIC PROPERTIES THROUGH ACTIVE MILLIMETER WAVE ILLUMINATION

(75) Inventors: Barry Thomas Smith, Egg Harbor City, NJ (US); James Christopher Weatherall, Linwood, NJ (US); Jeffrey Brian Barber, Vineland, NJ (US)

(73) Assignee: The United States of America, as Represented by the Secretary, Department of Homeland Security, Washington, DC (US)

( * ) Notice: Subject to any disclaimer, the term of this patent is extended or adjusted under 35 U.S.C. 154(b) by 379 days.

(21) Appl. No.: 13/441,080

(22) Filed: Apr. 6, 2012

(65) Prior Publication Data

US 2012/0256777 A1 Oct. 11, 2012

Related U.S. Application Data

(60) Provisional application No. 61/472,926, filed on Apr. 7, 2011.

(51) Int. Cl.
*G01J 5/02* (2006.01)
*G01S 13/88* (2006.01)
*G01S 7/41* (2006.01)
*G01S 13/89* (2006.01)

(52) U.S. Cl.
CPC .............. *G01S 13/887* (2013.01); *G01S 7/412* (2013.01); *G01S 13/89* (2013.01)
USPC .................................... 250/341.1; 250/338.1

(58) Field of Classification Search
USPC ............................................ 250/338.1, 341.1
See application file for complete search history.

(56) References Cited

U.S. PATENT DOCUMENTS

| 5,227,800 | A | 7/1993 | Huguenin et al. |
| 6,480,141 | B1 * | 11/2002 | Toth et al. ........................ 342/22 |
| 6,784,854 | B1 * | 8/2004 | Yukl ............................ 343/911 L |
| 7,692,150 | B2 | 4/2010 | Jung et al. |
| 7,889,113 | B2 | 2/2011 | Cardiasmenos et al. |
| 2009/0184861 | A1 | 7/2009 | Reinpoldt, III |
| 2011/0102235 | A1 * | 5/2011 | Abdillah et al. ................. 342/22 |

OTHER PUBLICATIONS

Gabriel et al, Dielectric parameters relevant to microwave dielectric heating, 1998, Chemical Society Reviews, vol. 27, pp. 213-223.*

(Continued)

*Primary Examiner* — Christine Sung
(74) *Attorney, Agent, or Firm* — Lavanya Ratnam; William Washington; Nathan Grebasch

(57) ABSTRACT

Described herein is a method by which active millimeter wave radiation may be used to detect and identify the composition of concealed metallic, concealed non-metallic, concealed opaque or concealed semi-transparent materials based on their optical properties. By actively radiating a semi-transparent target anomaly with multiple millimeter wave radiation frequencies, the dielectric properties of the target anomaly can be identified. The dielectric properties of the target anomaly may then be compared to a library of dielectric properties attributed to semi-transparent materials of interest. This method will allow active millimeter wave radiation technology to identify the likely composition of targeted semi-transparent materials through absorption and illumination measurements attributed to the dielectric properties of the targeted composition.

9 Claims, 4 Drawing Sheets

(56) References Cited

OTHER PUBLICATIONS

Barber et al., Millimeter Wave Measurements of Explosives and Simulants, Apr. 5, 2010, Passive Millimeter Wave Imaging Technology Conference, vol. 7670, pp. 76700E-1 to 76700E-7.*

Agilent Basics of Measuring the Dielectric Properties of Materials, Jun. 25, 2006. Agilent Technologies, pp. 1-32.*

Weatherwall, James C.; Optical Properties of RDX-Based Explosive at Millimeter Wavelengths Measured in Free Space Using a Millimeter Wave Camera; Technical Report; 18 pages; U.S. Department of Homeland Secuirty, Science and Technology Directorate, Office of Research and Development; NJ, USA.

Weatherall, James C.; Emission from dielectric materials at millimeter wavelengths in passive thermal environments; 8 pages; SRA International; NJ, USA.

Barber, Jeffrey; Weatherall, James C.; Smith, Barry T.;Duffy, Steve; Goettler, Stephen J.; Krauss, Ronald A.; Millimeter Wave Measurements of Explosives and Simulants; Report; U.S. Department of Homeland Secuirty, Science and Technology Directorate, Transportation Security Laboratory; NJ, USA.

* cited by examiner

METHOD FOR IDENTIFYING MATERIALS USING DIELECTRIC PROPERTIES THROUGH ACTIVE MILLIMETER WAVE ILLUMINATION

RELATED APPLICATIONS

This application claims priority under 35 U.S.C. §119(e) to U.S. Provisional Application Ser. No. 61/472,926, entitled "Method for Identifying Materials Using Dielectric Properties through Active Millimeter Wave Illumination," filed on Apr. 7, 2011.

BACKGROUND OF INVENTION

Active millimeter wave imaging is useful in security screening for concealed threats because of the property of millimeter waves to penetrate clothing. The technique is employed in personnel screening systems to detect concealed explosives, narcotics, weapons and other contraband in or beneath an individual's clothing because of the noninvasive nature of the scanning method and lack of physical contact required during an inspection. The detection method relies on the identification of anomalies in the images produced by the reflected radiation returned from the body of an inspected subject.

Millimeter wavelengths are relatively long and inherently lower in resolution than images formed from radiating means using shorter wavelengths. Because the detection of objects using millimeter wavelengths relies on the contrast between the millimeter wave reflection intensity from a body and the millimeter wave reflection intensity from an adjoining object or anomaly; the system cannot distinguish between benign objects and contraband. Such contrast based systems are not geared toward making composition based determinations other than metallic vs. opaque (with shape, or structural based determination methods also known in the prior art). Metallic objects will have a high reflection intensity and low emissivity, producing a more significant contrast with the reflection intensity and emissivity of the person, than an opaque non-metallic material. The inability to determine composition reduces detection to anomaly based detection instead of identity based detection, thus the detection of anomalies such as keys or other benign objects lead to a significant rate of false alarms which is problematic in implementing these systems as a personnel screening tool. The invention described herein relates to a method for identifying the composition of an anomaly detected using active millimeter wave reflectometry, so that the contraband may be distinguished from benign material through its relative permittivity or other dielectric properties.

SUMMARY OF INVENTION

In personnel imaging, millimeter wave images with active illumination are distinguished by differences in the radiation intensity emitted from a radiation source and the reflected signal from the target body (person). The reflected signal is relative to how the illumination by the body is transmitted or absorbed by the materials between the target body and a detector and the capability of measuring the intensity of reflection received from the target zone. The relevant property used to measure the brightness of an object in millimeter waves is the radiative intensity along the optical path directed towards the detector. The process described herein quantifies that radiative intensity in terms of the electromagnetic properties of the material (embodied in the complex dielectric constant), its thickness and intensity of reflection under active illumination.

The disclosed system and method include an active millimeter wave imaging system capable of irradiation by a plurality of frequencies (emitter). Such a system will typically consist of one or more millimeter wave energy sources with a frequency capability between 5 and 500 GHz (gigahertz), a detector for receipt of millimeter wave energy reflected from target zone, a computer or other data processing means and a local or remotely accessible database. Any number of narrower sub-bands between 5 and 500 GHz can be used in the invention. Because the absorption of millimeter wave radiation is frequency dependent, by directing a plurality of millimeter wave radiation emission frequencies through homogeneous target material of different optical depths and calculating the intensity of reflection for each illumination frequency, a linear correlation between the reflected intensity and optical depth of different materials may be obtained FIG. 1. It is thus possible to analyze imagery from illuminated targets obtained over different thicknesses and illumination frequencies to infer the complex dielectric constant and other optical properties of the materials illuminated as opposed to direct electrical measurement of the target material. Through the preparation of a database, or other collection means which comprise known values for the reflection intensity of target material at relative frequency of illumination from a target material of a known dielectric constant at a known geometric thickness, the reflection intensity obtained by a millimeter wave irradiation source can be compared against the collection of known reflection values within said computerized database to indicate the likely composition of the opaque material irradiated through a known or extrapolated reflection value.

DETAILED DESCRIPTION OF THE DRAWINGS

Figure 1:
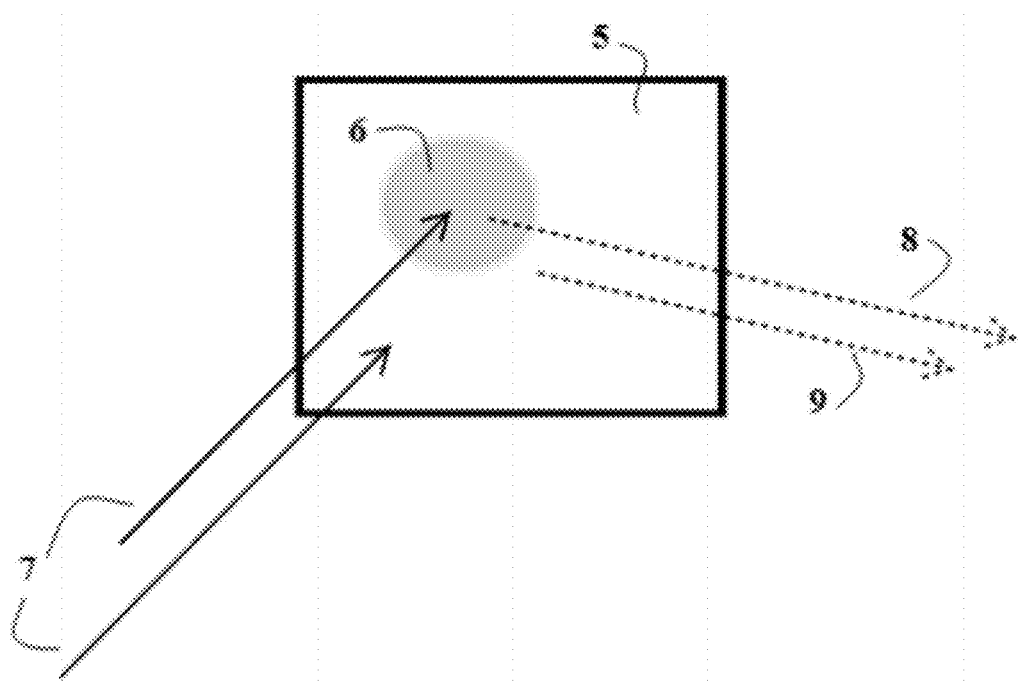
FIG. 1: Illuminating the target area and objects therein using only a single band of millimeter wave radiation. Solid lines indicate incident radiation; dashed lines are reflected radiation.

FIG. 1 shows a background 5 (such as a human body) and a concealed object 6. The background 5 and object 6 are illuminated by a single band of millimeter wave radiation 7. Radiation 8, reflected from the object 6, and radiation 9, reflected from the background 5, are collected and measured by a detector and analyzed to calculate the dielectric properties of the object 6.

Figure 2:
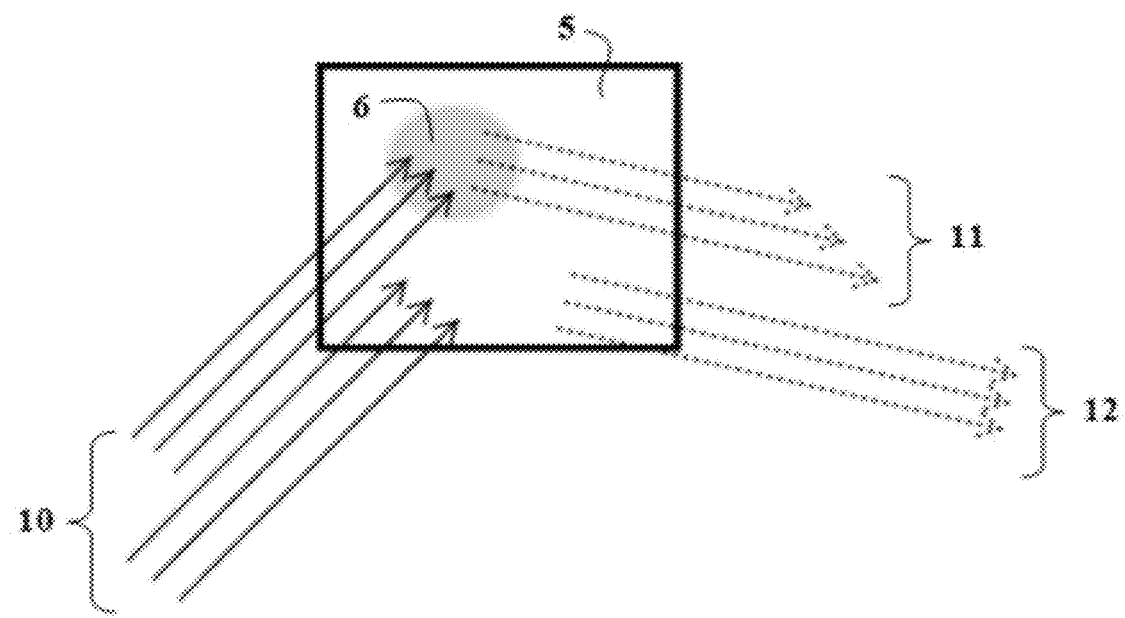
FIG. 2: Illuminating the target area and objects therein using three distinct bands of millimeter wave radiation. Solid lines indicate incident radiation; dashed lines are reflected radiation.

FIG. 2 shows the same background 5 and object 6 as FIG. 1. Here the background 5 and object 6 are illuminated by three distinct bands of millimeter wave radiation 10. Radiation 11, reflected from the object 6, and radiation 12, reflected from the background 5, are collected and measured by a detector and analyzed to calculate the dielectric properties of the object 6. Because intensity of reflected radiation varies with the frequency of incident radiation (shown by the varied line lengths of 11), the reflected radiation collected from multiple bands is both more complex and more informative than the reflected radiation collected from only a single band.

Figure 3:
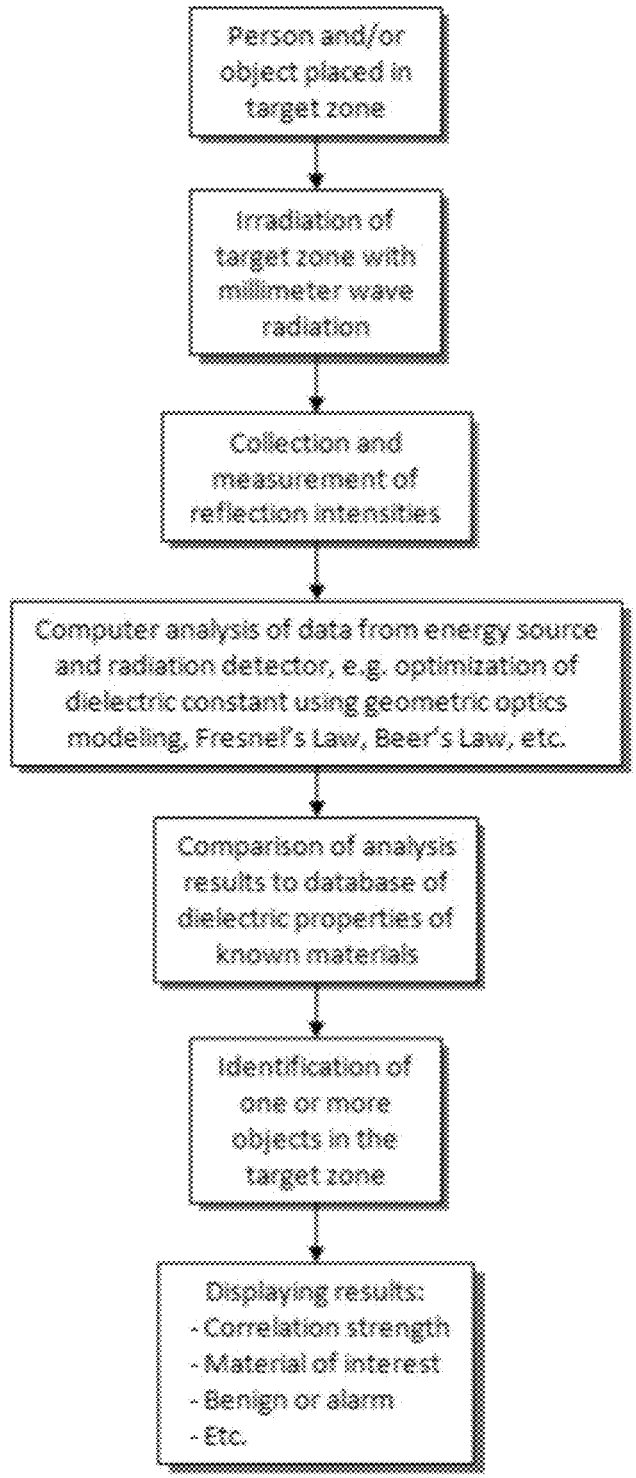
FIG. 3: Simple flowchart of overall method for identifying materials by measuring radiation and calculating dielectric properties.

FIG. 3 shows a simple flow chart of the overall method for identifying materials by measuring dielectric properties. The person and/or object to be characterized is placed in the target zone and subsequently irradiated with millimeter wave radiation produced by the radiation source. Reflected radiation is collected and measured by a radiation detector and subsequently analyzed by a computer, along with relevant data from the radiation source. The computer calculates the dielectric properties of objects in the target zone and compares results with a database containing the dielectric properties of known materials. The comparison results in the identification of the object or objects, and the results are displayed along with application-specific information such as correlation strength, highlighting the detection of materials of interest, benign or alarm indicators (e.g. for explosives detection applications), and so forth.

Figure 4:
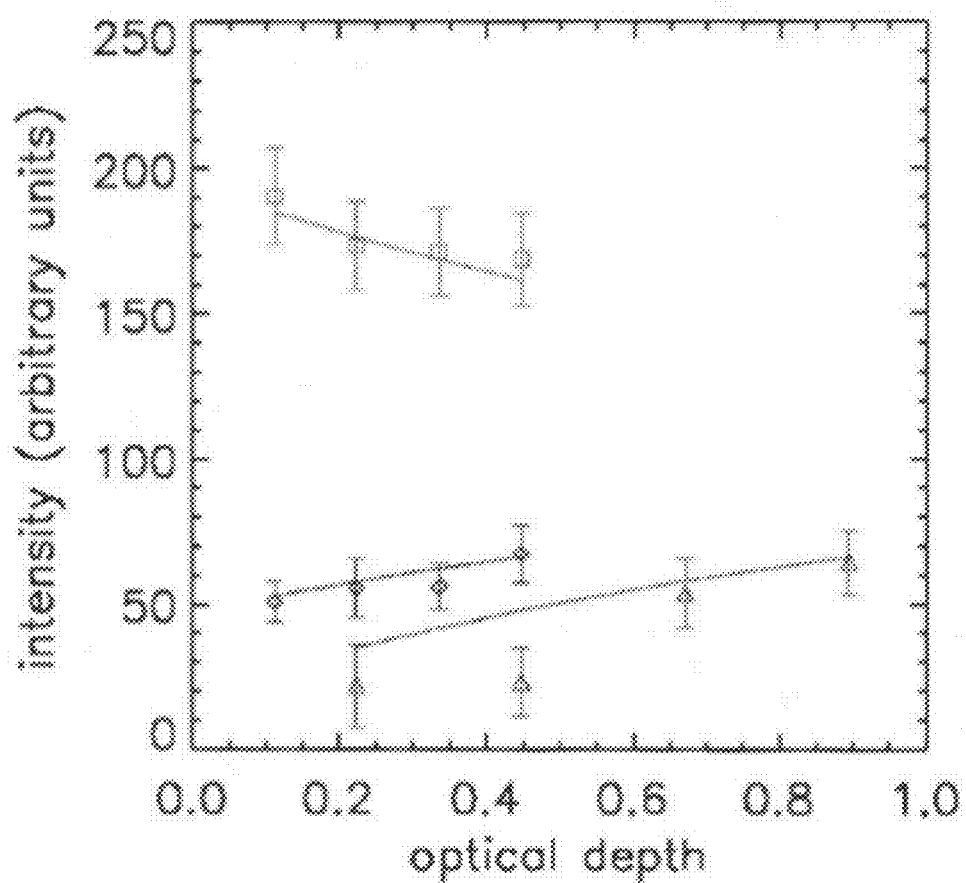
FIG. 4: Millimeter wave intensity observed as a function of optical depth for layered polycarbonate sheet at three different illumination environments. The lines are a model fit.

FIG. 4 shows a chart of millimeter wave intensity observed as a function of optical depth. The representative measurements used a layered polycarbonate sheet illuminated at three different settings. The lines on the chart are a model fit for the several data points at each setting.

DETAILED DESCRIPTION OF THE INVENTION

One embodiment of the described invention comprises a millimeter wave energy source capable of emitting (an emitter) at least three different discrete bands of millimeter wave radiation utilizing a frequency range between 5 and 500 GHz, used to illuminate a target zone. Frequencies higher than 500 GHz suffer from high specular reflection from cloth, and make penetration at other than normal angles difficult. A detector, capable of measuring the intensity of reflection received from the target zone is part of the embodiment. A computer or other computational means for receiving and determining the measurement of reflection intensity received from illuminated objects within the target zone that is capable of optimization of the dielectric constant using geometric optics modeling. A database comprising the dielectric properties of materials which is used by the computer means to compare/identify the composition of the target anomaly. Such comparison may be made by computer algorithm capable of discriminating between benign materials and materials whose dielectric properties indicate the substance may be contraband.

Another embodiment comprises the embodiment of the preceding paragraph, whereby the target is allegedly a known homogeneous material and a refection intensity that does not correspond to the expected reflection intensity calculated from said database is indicative that the material is not homogeneous. Such embodiment to be used in production quality control determinations of opaque materials.

Another embodiment comprises an emitter, capable of variable emission in the frequency range between 5 and 500 GHz and detector, that uses coherence, magnitude, phase, polarity, or other measurable electromagnetic quantities as the reflection parameters which are compared to said database values to determine though computer algorithms what substances are benign materials and materials whose properties indicate the substance may be contraband.

Another embodiment may consist of a database that uses automated identification of target anomaly through comparison of predetermined dielectric properties' and assessed data from actual anomaly detection events where the intensity of reflection did not match the expected statistical extrapolation.

Another embodiment uses an array of independent emitters where the emitters are arranged in a pattern that will illuminate the target zone from different angles. Such an array will allow illumination by multiple emission streams at angles other than normal to the surface. By using emission streams at multiple angles, a single target may be illuminated utilizing different optical depths. A model may then be generated by specifying optical parameters of portions of the target and orientation of illumination from emission source.

In another embodiment the method of target composition identification described herein may be used independently or in conjunction with standard MMW device operating under normal parameters using contrast of reflection intensity between body and anomaly to identify objects of interest. In such an embodiment the intensity of reflection output as a contrast element in standard MMW it would be provided as a value of reflection intensity and then compared to a database of reflection intensity values attributed to the dielectric properties of contraband material.

What is claimed is:

1. A detection method, comprising:
    detecting a range of energy reflected from a target;
    comparing the detected energy with a database of optical properties obtained from illuminating objects having known properties with a range of millimeter wave energy that corresponds to the range of energy;
    identifying a contraband item associated with the target based on the comparison, the contraband item being identifiable based on a dielectric property of a material at least partially forming the contraband item.

2. The method of claim 1, further comprising displaying an alarm to alert a user to the contraband item's existence.

3. The method of claim 1, wherein the reflected energy is in the millimeter wavelength.

4. The method of claim 1, wherein the known properties comprise one or more of object thickness, illumination frequency, homogeneity of material forming an object included in the objects, a dielectric property of a material at least partially forming one of the objects.

5. The method of claim 1, wherein the database comprises optical properties of anomaly detection events in which the range of energy detected for a contraband item did not correspond to optical properties for objects with known properties.

6. The method of claim 1, wherein the identifying is at least partially dependent on frequency dependent absorption of energy of the material.

7. A detection method, comprising:
    detecting a range of energy reflected from material associated with a target, the range of energy being generated from emission of a plurality of millimeter wave radiation emission frequencies;
    comparing the range of energy with a database populated with ranges of energies corresponding to known materials; and
    identifying the material associated with a target by matching the range of energy from the material with that of at least one of the known materials to identify the material based on frequency dependent absorptions occurring within the range.

8. The method of claim 7, wherein the plurality of millimeter wave radiation emission frequencies comprises more than two energies.

9. The method of claim 7, wherein the plurality of millimeter wave radiation emission frequencies comprises at least three discrete bands of millimeter waves.

\* \* \* \* \*